US010761672B2

(12) United States Patent
Murarka et al.

(10) Patent No.: US 10,761,672 B2
(45) Date of Patent: Sep. 1, 2020

(54) SOCIALIZED DASH

(71) Applicant: Facebook, Inc., Menlo Park, CA (US)

(72) Inventors: Neel Ishwar Murarka, Menlo Park, CA (US); Philip Fung, San Francisco, CA (US); Niv Seker, San Francisco, CA (US); Adam Mosseri, San Francisco, CA (US); Francis Luu, San Francisco, CA (US); Carl Phillip Sjogreen, San Francisco, CA (US); Cory Rudolph Ondrejka, Pleasant Hill, CA (US); Bret Steven Taylor, Los Gatos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/729,634

(22) Filed: Dec. 28, 2012

(65) Prior Publication Data

US 2014/0189531 A1 Jul. 3, 2014

(51) Int. Cl.
*G06F 3/048* (2013.01)
*G06Q 50/00* (2012.01)
*G06Q 10/00* (2012.01)

(52) U.S. Cl.
CPC .............. *G06F 3/048* (2013.01); *G06Q 10/00* (2013.01); *G06Q 50/01* (2013.01)

(58) Field of Classification Search
None
See application file for complete search history.

(56) References Cited

U.S. PATENT DOCUMENTS

| 6,763,379 | B1 * | 7/2004 | Shuster | G06Q 30/0264 |
| | | | | 709/219 |
| 8,312,500 | B2 | 11/2012 | Emerson | |
| 8,315,616 | B2 * | 11/2012 | Martinez | H04M 1/72522 |
| | | | | 455/418 |
| 8,655,307 | B1 * | 2/2014 | Walker | H04W 52/0212 |
| | | | | 455/405 |
| 9,098,856 | B2 * | 8/2015 | Sinn | G06Q 30/02 |

(Continued)

FOREIGN PATENT DOCUMENTS

| CN | 101005463 | 7/2007 |
| CN | 101167066 | 4/2008 |

(Continued)

OTHER PUBLICATIONS

International Search Report and Written Opinion for International Application PCT/US2013/078267, dated Apr. 28, 2014.

(Continued)

*Primary Examiner* — Hua Lu
(74) *Attorney, Agent, or Firm* — Jordan IP Law, LLC (57) ABSTRACT

In one embodiment, a method includes determining whether a user of the mobile computing device is currently actively using an application on the mobile computing device; and if the user is not currently actively using an application on the mobile computing device, then automatically and without user input providing for display to the user on the mobile computing device a user interface (UI) including a number of interactive elements that each correspond to one of a number of social-networking functionalities provided at least in part by a social-networking system remote from the mobile computing device.

21 Claims, 7 Drawing Sheets

(56) References Cited

U.S. PATENT DOCUMENTS

| | | | |
|---|---|---|---|
| 2006/0262223 A1 | 11/2006 | Lee et al. | |
| 2007/0192369 A1 | 8/2007 | Gross | |
| 2007/0259673 A1* | 11/2007 | Willars | H04W 52/0225 455/453 |
| 2008/0040474 A1* | 2/2008 | Zuckerberg | G06Q 30/02 709/224 |
| 2008/0070209 A1* | 3/2008 | Zhuang | G06Q 10/10 434/236 |
| 2008/0096505 A1 | 4/2008 | Martinez | |
| 2009/0021486 A1* | 1/2009 | Chaudhri | G06F 9/44505 345/173 |
| 2009/0061837 A1* | 3/2009 | Chaudhri | G06F 3/0481 455/418 |
| 2010/0095208 A1* | 4/2010 | White | G06F 11/3438 715/704 |
| 2010/0105440 A1* | 4/2010 | Kruzeniski | G06F 3/0482 455/566 |
| 2010/0146384 A1* | 6/2010 | Peev | H04M 1/673 715/255 |
| 2010/0280904 A1* | 11/2010 | Ahuja | G06Q 30/02 705/14.58 |
| 2010/0299634 A1* | 11/2010 | Cho | G06F 3/0482 715/810 |
| 2010/0321587 A1 | 12/2010 | Kerofsky | |
| 2011/0087842 A1* | 4/2011 | Lu | G06F 16/9535 711/126 |
| 2011/0276396 A1* | 11/2011 | Rathod | G06Q 10/00 705/14.49 |
| 2012/0023390 A1* | 1/2012 | Howes | G06F 16/951 715/205 |
| 2012/0076367 A1* | 3/2012 | Tseng | G06K 9/00288 382/118 |
| 2012/0079045 A1* | 3/2012 | Plotkin | H04L 51/12 709/206 |
| 2012/0079606 A1 | 3/2012 | Evans | |
| 2012/0089690 A1* | 4/2012 | Hein | G06Q 10/10 709/206 |
| 2012/0095979 A1* | 4/2012 | Aftab | H04W 4/029 707/706 |
| 2012/0096037 A1 | 4/2012 | Sittig | |
| 2012/0102114 A1* | 4/2012 | Dunn | G06Q 10/10 709/204 |
| 2012/0133486 A1 | 5/2012 | Park | |
| 2012/0170451 A1* | 7/2012 | Viswanathan | H04W 4/70 370/230 |
| 2012/0214442 A1* | 8/2012 | Crawford | H04W 12/06 455/411 |
| 2012/0226564 A1* | 9/2012 | Mirrokni Banadaki | G06Q 30/0254 705/14.66 |
| 2012/0272230 A1* | 10/2012 | Lee | G06F 1/329 717/173 |
| 2012/0278475 A1* | 11/2012 | Papakipos | G06Q 10/10 709/224 |
| 2012/0284297 A1* | 11/2012 | Aguera-Arcas | G06F 3/03547 707/769 |
| 2012/0290953 A1* | 11/2012 | Russell | H04N 21/4756 715/758 |
| 2012/0290972 A1* | 11/2012 | Yook | G06F 3/0482 715/800 |
| 2012/0310922 A1 | 12/2012 | Johnson | |
| 2012/0311033 A1* | 12/2012 | Tseng | G06Q 30/0269 709/204 |
| 2012/0323933 A1* | 12/2012 | He | G06Q 10/107 707/749 |
| 2012/0324041 A1 | 12/2012 | Gerber | |
| 2012/0324094 A1* | 12/2012 | Wyatt | H04W 4/60 709/224 |
| 2012/0331548 A1* | 12/2012 | Tseng | H04M 1/67 726/19 |
| 2013/0031172 A1* | 1/2013 | Olsen | H04L 51/28 709/204 |
| 2013/0060841 A1* | 3/2013 | Knight | G06F 16/437 709/203 |
| 2013/0069962 A1* | 3/2013 | Nealer | H04M 1/72544 345/522 |
| 2013/0110978 A1* | 5/2013 | Gordon | H04N 21/2665 709/218 |
| 2013/0117451 A1* | 5/2013 | Du | H04L 63/10 709/225 |
| 2013/0132854 A1* | 5/2013 | Raleigh | G06F 3/0482 715/738 |
| 2013/0162667 A1* | 6/2013 | Eskolin | G06F 3/0488 345/619 |
| 2013/0167041 A1* | 6/2013 | Huang | G06F 3/0485 715/753 |
| 2013/0191775 A1* | 7/2013 | Lawson | G06F 3/0482 715/784 |
| 2014/0189056 A1 | 7/2014 | St. Clair | |
| 2014/0189524 A1 | 7/2014 | St. Clair | |
| 2014/0189539 A1 | 7/2014 | St. Clair | |
| 2014/0230025 A1* | 8/2014 | Abhyanker | G06Q 10/087 726/4 |

FOREIGN PATENT DOCUMENTS

| | | |
|---|---|---|
| CN | 101438612 A | 5/2009 |
| CN | 101960444 A | 1/2011 |
| CN | 102109945 | 6/2011 |
| CN | 102150175 A | 8/2011 |
| CN | 102395993 | 3/2012 |
| CN | 102402661 | 4/2012 |
| CN | 102576366 A | 7/2012 |
| CN | 102685026 | 9/2012 |
| CN | 102790831 | 11/2012 |
| EP | 2068236 A1 | 6/2009 |
| EP | 2 363 833 A1 | 9/2011 |
| JP | 2006/099532 | 4/2006 |
| JP | 2006-139778 | 6/2006 |
| JP | 2009-15379 | 1/2009 |
| JP | 2009-212997 | 9/2009 |
| JP | 2010/500650 | 1/2010 |
| JP | 2010-523046 | 7/2010 |
| JP | 2011-130104 | 6/2011 |
| JP | 2012-527700 | 11/2012 |
| KR | 10-2012-0088784 | 8/2012 |
| KR | 101194766 B1 | 10/2012 |
| KR | 20120126161 A | 11/2012 |
| WO | WO 2011/052083 A1 | 5/2011 |
| WO | WO 2011/070366 A1 | 6/2011 |
| WO | WO 2011070366 A1 | 6/2011 |
| WO | WO 2011-163204 A2 | 12/2011 |
| WO | WO 2012/078079 A2 | 6/2012 |
| WO | WO 2012/112780 | 8/2012 |
| WO | WO 2012/166876 A2 | 12/2012 |

OTHER PUBLICATIONS

International Search Report and Written Opinion for International Application PCT/US2013/078302, dated Jun. 3, 2013.
International Search Report and Written Opinion for International Application PCT/US2013/073248, dated Mar. 14, 2014.
European Search Report 13195616.1-1958, dated Feb. 27, 2014.
International Search Report and Written Opinion for PCT/US2013/078316, dated Apr. 15, 2014.
EP Communication for 13195616.1-1959, dated Mar. 17, 2015.
Communication, European Patent Office, Application No. 13195616.1, dated Nov. 29, 2016.
EPO Communication, Supplementary European Search Report and Annex to the European Search Report for Application No. EP 13 86 7468, dated Jul. 19, 2016.
EPO Communication, Supplementary European Search Report and Annex to the European Search Report for Application No. EP 13 86 8262, dated Jul. 19, 2016.
Communication, Supplementary European Search Report, Annex to the European Search Report, European Patent Office, European Patent Application No. 13 86 6729, dated Nov. 3, 2016.

(56) References Cited

OTHER PUBLICATIONS

Notification of the First Office Action, the State Intellectual Property Office of the People's Republic of China, Patent Application No. 2013800735567 (with English translation), dated May 2, 2017.
Notification of the First Office Action, The State Intellectual Property Office of the People's Republic of China, Patent Application No. 2013800739905 (with English translation), dated Mar. 8, 2017.
Decision to refuse a European Patent application, European Patent Office, Patent Application No. 13 195 616.1, dated Mar. 9, 2017.
Ayumi Fukaya, "How to use Facebook Timeline: From cover photo to privacy setting", book, Nov. 15, 2011, p. 2-4,URL, https://web.archive.org/web/20121224072106/http://socialmediaexperience.jp/4494, Nov. 15, 2011.
1st Requirement of Substantive Examination PLI PCT, Mexican Institute of Industrial Property, Patent Application No. MX/a/2015/008431 (with English translation), Oct. 20, 2017.
Notification of the Second Office Action, The State Intellectual Property Office of the People's Republic of China, Patent Application No. 2013800735567 (with English translation), dated Nov. 6, 2017.
Notification of Reasons for Rejections, Japan Patent Office, Patent Application No. 2015-550837 (with English translation), dated Nov. 7, 2017.
Notification of Reasons for Rejection, Japan Patent Office, Patent Application No. 2015-550844 (with English translation), dated Nov. 14, 2017.
Examination report No. 1 for standard patent application, Australian Government, Patent Application No. 2013370178, dated Nov. 23, 2017.
Notification of the First Office Action, The State Intellectual Property Office of the People's Republic of China, Patent Application No. 201380073991X, dated Nov. 3, 2017.
Usability dramatically improvement, mobileASCII vol. 9, book, ASCII MediaWorks Corporation, Feb. 29, 2012, vol. 9, p. 18-19 (without English translation), Feb. 29, 2012.
Morishima Ryoko, Appendix of April issue of Androider +, Book for the first time on Facebook, Impress Japan Co., Ltd., Sep. 6, 2012, p. 55 (without English translation), Sep. 6, 2012.
Notification of Reasons for Rejection, Japan Patent Office, Patent Application No. 2015-550419 (with English translation), dated Oct. 10, 2017.
Notice of Allowance, Korean Intellectual Property Office, Patent Application No. 10-2015-7020547 (with English translation), dated Oct. 27, 2017.
Notification of Reasons for Rejection, Japan Patent Office, Patent Application No. 2015-550842 (with English translation), dated Jan. 17, 2018.
CN Office Action received for Patent Application No. 2013800738921. (with English Translation), dated Sep. 3, 2018.
Decision of Rejection for Application No. 2015-550837 from Japanese Patent Office, dated May 22, 2018.
Notification of the Second Office Action regarding Application No. 201380073991X from The State Intellectual Property Office of the People's Republic of China, dated Jun. 4, 2018.
Decision of Rejections for application No. 2013/800735567 from The State Intellectual Property Office of the People's Republic of China, dated Apr. 3, 2018.
AU Office Action received for Patent Application No. 2013368326, dated Sep. 26, 2018.
MX Office Action received for Patent Application No. MX/a/2015/008430. (with English Translation), dated Sep. 19, 2018.
MX Office Action received for Patent Application No. MX /a/2015/008447. (with English Translation), dated Sep. 25, 2018.
CN Office Action received for Patent Application No. 2013800735567. (with English Translation), dated Nov. 5, 2018.

AU Office Action received from AUIPO for Patent Application No. 2013370163, dated Jun. 29, 2018.
CA Office Action received for Patent Application No. 2,895,263, dated Jul. 12, 2018.
IL Office Action received for Patent Application No. 239590. (with English Translation), dated Jun. 21, 2018.
Communication Pursuant to Article 94(3) EPC regarding Application No. 13 866 729.0-1222 from European Patent Office, dated Mar. 8, 2018.
AU Office Action received for Patent Application No. 2013370175, dated Aug. 25, 2018.
IL Office Action received for Patent Application No. 239587. (with English Translation), dated Jun. 21, 2018.
Notification of the First Office Action from The State Intellectual Property Office of the People's Republic of China for Application No. 2013-800738921(with English Translation), dated Jan. 30, 2018.
Communication pursuant to Article 94(3) EPC from European Patent Office for Application No. 13 867 468.4-1222, dated Jan. 25, 2018.
Communication pursuant to Article 94(3) EPC from European Patent Office for Application No. 13 868 262.01-1222, dated Jan. 30, 2018.
JP Office Action received from JPO for Patent Application No. 2015-550419. (with English Translation), dated Jul. 3, 2018.
CN Office Action received for Patent Application No. 201380073991X. (with English Translation), dated Jan. 23, 2019.
MX Office Action received for Patent Application No. MX/a/2015/008430. (with English Translation), dated Jan. 22, 2019.
MX Office Action received for Patent Application No. MX/a/2015/008452. (with English Translation), dated Dec. 18, 2018.
Notification of the Third Office Action for CN Patent Application No. 2013800738921 (with English translation), dated Mar. 5, 2019.
Office Action received for CA Patent Application No. for 2,895,263, dated Mar. 21, 2019.
Notice before Allowance of Israeli Patent Application No. 239589, dated Jan. 4, 2019.
AU Office Action received for Patent Application No. 2013370175, dated Aug. 2, 2019.
Office Action for IL Patent Application No. 239587, dated Jul. 7, 2019.
KR Office Action received from KIPO for Patent Application No. 10-2015-7020546. (with English Translation), dated Oct. 16, 2019.
CA Office Action received from CAIPO for Patent Application No. 2,895,263, dated Aug. 6, 2019.
Examination Report for Canadian Patent Application No. 2,895,536, dated Nov. 21, 2019, 3 pages.
Office Action for Brazilian Patent Application No. 1120150158030, dated Jan. 27 2020, 9 pages including 5 pages of English translation.
Office Action for Brazilian Patent Application No. 1120150158048, dated Jan. 27 2020, 9 pages including 5 pages of English translation.
Office Action for Brazilian Patent Application No. 1120150156380, dated Jan. 27 2020, 8 pages including 4 pages of English translation.
Office Action for India Patent Application No. 4295/CHENP/2015, dated Mar. 19, 2020, 6 pages.
Office Action for India Patent Application No. 4369/CHENP/2015, dated Mar. 19, 2020, 5 pages.
Office Action for Brazilian Patent Application No. 112015015434, dated Apr. 6, 2020, 8 pages including 4 pages of English translation.
Office Action for Canadian Patent Application No. 2,895,263, dated Apr. 17, 2020, 5 pages.
Office Action for Korean Patent Application No. 2015-7020549, dated May 6, 2020, 10 pages including 5 pages of English translation.
Office Action for Korean Patent Application No. 10-2015-7020548, dated May 14, 2020, 11 pages including 5 pages of English translation.

* cited by examiner

SOCIALIZED DASH

TECHNICAL FIELD

This disclosure generally relates to mobile devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a socialized dash may be a lock screen or a home screen that replaces the launcher of a mobile device. The socialized dash may be provided for display when the user presses the "home" button, locking the mobile device, after using an application, or making a call using the mobile device. In particular embodiments, the socialized dash may include interactive elements that correspond to social-networking functionality. In particular embodiments, the socialized dash may include an area to display social-action notifications from social-networking system, such as for example the newsfeed and notifications, along with incoming messages (e.g. missed call information or SMS message). The user may interact with the elements on the socialized dash without launching an application or unlocking the mobile device. For example, the user may comment on or "like" a status update or SMS message from the dash. The elements displayed by the dash may be updated in real-time as content is being generated or uploaded to the social-networking system.

In particular embodiments, the appearance of the dash may be customized for the user using the social-network ID of the user. For example, the background picture of the dash page may be the profile picture of the user. In particular embodiments, the socialized dash may be the lock screen of the mobile device. In particular embodiments, tension scrolling of the socialized dash may be performed to unlock mobile device. In particular embodiments where the user has a PIN lock, tension scrolling of the dash will take the user to the PIN screen.

DESCRIPTION OF EXAMPLE EMBODIMENTS

Figure 1:
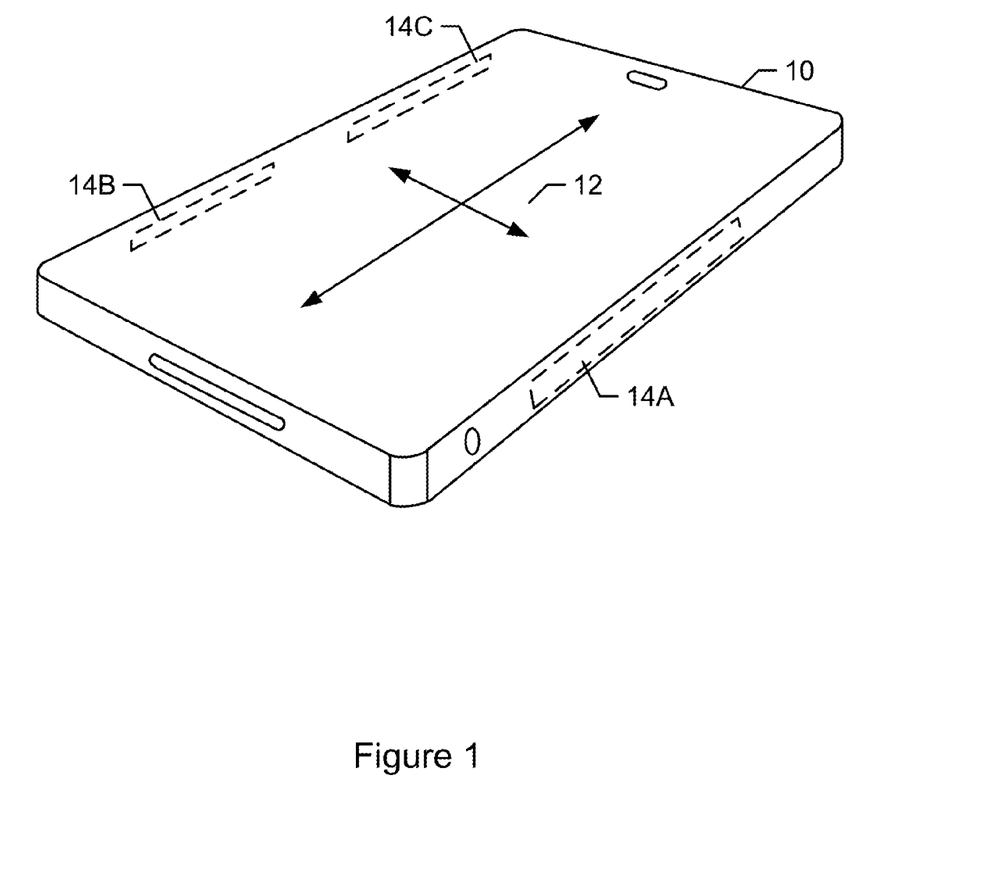
FIG. 1 illustrates an example mobile computing device.

FIG. 1 illustrates an example mobile computing device. In particular embodiments, the client system may be a mobile computing device 10 as described above. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile computing device 10 may have a touch sensor 12 as an input component. In the example of FIG. 1, touch sensor 12 is incorporated on a front surface of mobile computing device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 1, one or more antennae 14A-B may be incorporated into one or more sides of mobile computing device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile device many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate.

In particular embodiments, mobile computing device 10 may display a socialized dashboard or "dash" that is a constantly accessible (i.e. "persistent") user interface (UI) that may be displayed on mobile computing device 10 when the user is not actively interacting with an application executed on mobile computing device 10. As an example and not by way of limitation, the persistent UI or socialized dash may be an application that functions as a home or default screen of mobile computing device 10, as described below. As another example, the persistent UI or socialized dash may be provided for display on mobile computing device 10 in response to a user actuating a "home" button, after using or closing an application executed on mobile computing device 10, after completing a telephone call on mobile computing device 10, or in response to any suitable action. In particular embodiments, the socialized dash may be accessed at any time, including during interaction with an application, by performing a pre-determined gesture detected through touch sensor 12. As an example and not by way of limitation, the user may access the socialized dash by tapping and holding the top of the display area and pulling down the socialized dash, thereby revealing the social-networking interactive elements and incoming messages of socialized dash, described below. Although this disclosure illustrates and describes a particular type of computing device, this disclosure contemplates a socialized dash implemented on any suitable type of computing device, such as for example, a personal computer, tablet computer, connected television, or a smartphone. As an example and not by way of limitation, the socialized dash may be an application that may set one or more settings of mobile computing device 10, such as for example, the background image of mobile computing device 10, and associate particular functions of mobile device 10 to particular applications installed on mobile computing device 10, such as for example, the default web browser. In particular embodiments, one or more settings of the socialized dash, such as for example the background image, may be customized using social-graph information associated with the user of mobile computing device 10. As an example and not by way of limitation, the appearance of the socialized dash may be customized for the user using a social-network identification (ID) associated with the user. Moreover, the background image of the socialized dash may be a picture associated with the social-network ID of the user, such as for example, a profile picture.

In particular embodiments, the socialized dash may include one or more social-networking interactive elements, such as for example icons, that correspond to one or more social-networking functions provided at least in part by a social-networking system, as described below. In particular embodiments, the socialized dash may include an area for displaying incoming messages and social-action notifications to the user. As described below, this area of the socialized dash may dynamically aggregate various types of incoming messages, social-activity notifications, or content objects from applications installed on mobile computing device 10, or from the social-networking system or third-party system through a communication protocol. In particular embodiments, the display of mobile computing device 10 may be locked, preventing any or a particular interaction with mobile computing device 10. The socialized dash may function as a lock screen when mobile computing device 10 is in a locked mode. In particular embodiments, when the socialized dash is functioning as a lock screen, the user may be able to access all or a subset of all the features of the socialized dash available to the user during normal operation of mobile computing device 10.

Figure 2A:
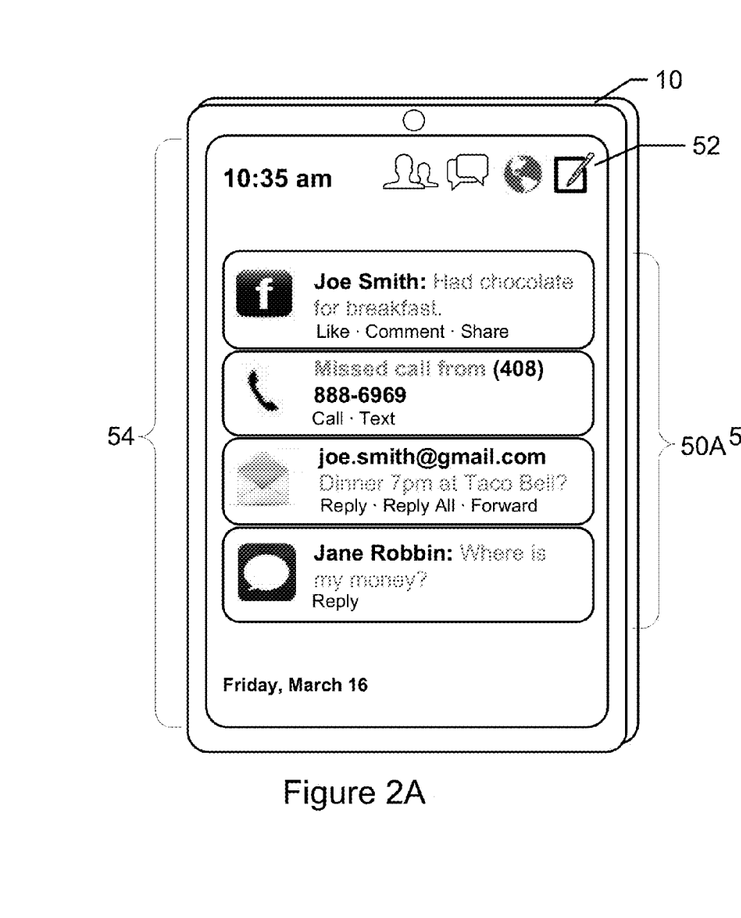
FIGS. 2A-C illustrate example wireframes for an example socialized dash.
Figure 2B:
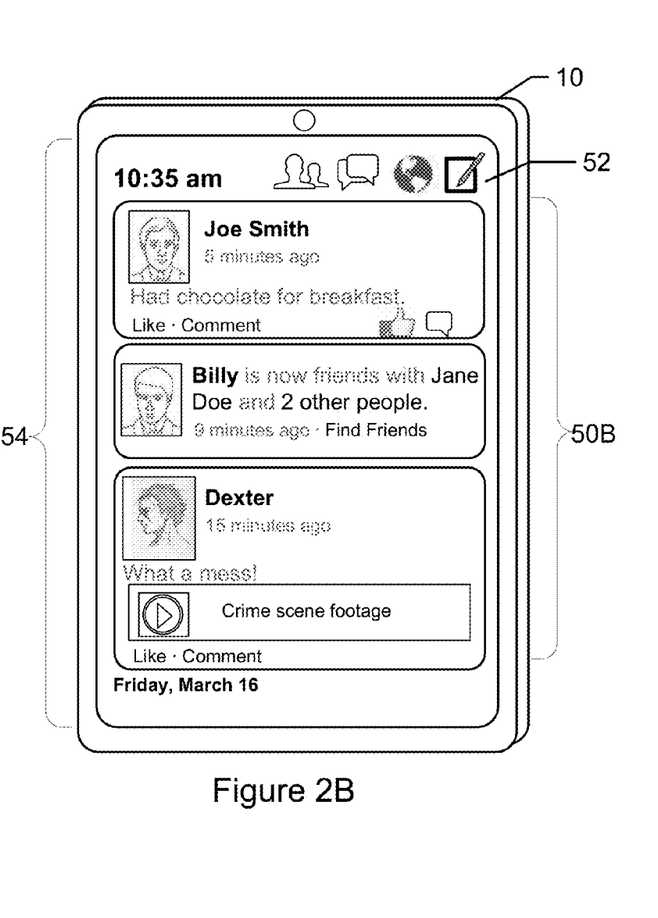
Figure 2C:
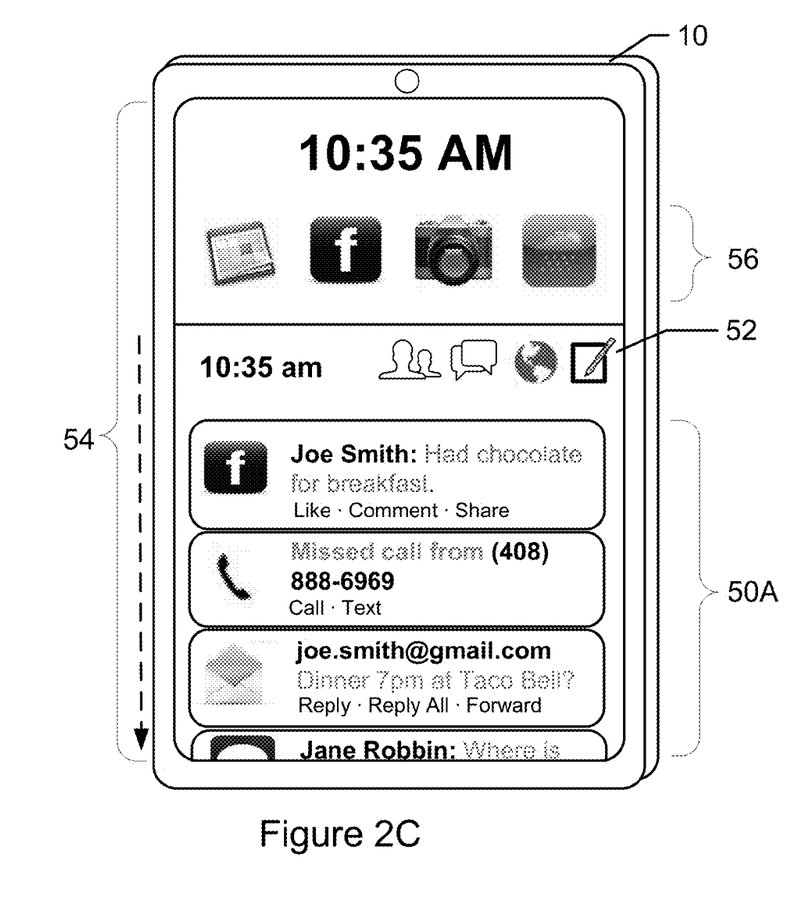

FIGS. 2A-C illustrate example wireframes for an example socialized dash. As described above, socialized dash 54 may be a persistent UI provided for display on mobile device 10. In particular embodiments, socialized dash 54 may include one or more social-networking interactive elements 52 that correspond to one or more social-networking functions provided at least in part by a social-networking system. As an example and not by way of limitation, social-networking interactive elements 52 may correspond to social-networking functionalities, such as for example, a friend feature, a message feature, or posting to the social-networking system, as illustrated in the example of FIG. 2A-B. In particular embodiments, the friend feature of the social-networking system may include functionality such as for example, sending friend requests to users, responding to friend requests from users, searching for users on the social-networking system, or accessing user profiles of users on the social-networking system. In particular embodiments, posting to the social-networking system may include functionality such as for example, uploading a photograph or video, checking in at a location, updating a status of the user, or uploading a comment on a post by another user on the social-networking system (i.e. "friend"). Herein, the term "friend" may refer to any other user of a social-networking system with whom the user associated with mobile computing device 10 has formed a connection, association, or relationship via the social-networking system. In particular embodiments, the message feature may include functionality, such as for example, writing a message to another user or replying to a message from another user on the social-networking system. In particular embodiments, the user of mobile computing device 10 may interact with the social-networking system through social-networking interactive elements 52 without launching an application associated with the social-networking system or using a web browser. As an example and not by way of limitation, the user of mobile computing device 10 may write a message to another user of the social-networking system by tapping on a particular social-networking interactive element 52 of socialized dash 54. In particular embodiments, the message from the user of mobile computing device 10 written using social-networking interactive element 52 may be sent to the social-networking system in real-time using a communication protocol, as described above. Although this disclosure illustrates and describes a socialized dash with interactive elements corresponding to particular functionalities of particular computing systems, this disclosure contemplates a dash with any suitable interactive elements corresponding to any suitable functionality of any suitable computing system, such as for example, one or more social-networking or third-party system.

As described above, socialized dash 54 may include an area 50A for displaying incoming messages and social-action notifications to the user, as illustrated in the example of FIG. 2A. As an example and not by way of limitation, the incoming messages may include e-mail or short-messaging service (SMS) messages, voice mail, missed telephone calls, instant messages (IM), messages provided by a feature of the social-networking system, etc. As another example, social-action notifications displayed in area 50A may include notification of actions by other users on the social-networking system that relate to the user, such as for example, friend requests, social events, or social calendars. As another example, social-action notifications may include notifications of actions by other users on the social-networking system, such as for example, status updates, comments, or likes of other users the social-networking system. In the example of FIG. 2B, area 50B may display newsfeed or ticker items associated with a newsfeed or ticker provided by the social-networking system. In particular embodiments, the newsfeed or ticker items displayed in area 50B may be actions by other users with a relationship to the user of mobile computing device 10 based on social-graph information.

In particular embodiments, social-action notifications may be periodically pushed (i.e. sent to mobile computing device 10 without input from mobile computing device 10) by, for example, a server of the social-networking system, to mobile computing device 10. Alternatively or in addition, mobile device 10 may pull (i.e. sent to mobile computing device 10 after receiving a signal from mobile computing device 10) social-action notifications to mobile computing device 10. As an example and not by way of limitation, the incoming messages, social-action notifications, or newsfeed items provided for display in areas 50A-B may be natively generated from applications installed on mobile computing device 10, generated in connection with the social-networking system, or generated by third-party systems, such as for example, a news aggregator. Although this disclosure illustrates and describes a socialized dash with an area for displaying particular content objects, this disclosure contemplates a socialized dash with an area for displaying any suitable content objects, such as for example, stock price alerts, news notifications, or RSS (really simple syndication) feeds.

In particular embodiments, the user of mobile computing device 10 may interact with the social-networking system through social-networking interactive elements 52 or notifications in areas 50A-B directly from socialized dash 54 without launching or executing an application. As an example and not by way of limitation, the user of mobile computing device 10 may comment on or "like" a status update on the social-networking system through a social-networking interactive element 52 without launching an application associated with the social-networking system. In particular embodiments, the incoming messages displayed in area 50A may include options that enable the user of mobile device 10 to interact with the incoming messages. As an example and not by way of limitation, if the incoming message is a notification of a SMS message, there may be options corresponding to actions such as for example "reply", "forward", or "delete", from which the user of mobile device may select a particular action to perform in response to the SMS message, where the particular action may cause another application to be launched (e.g. a SMS application). As another example, if the incoming message is a newsfeed item that includes a photo, the user may cause the photo to expand to cover most or all of the display area through a pre-determined touch gesture, and then perform social-network interactions related to the photo, such as for example, comment, like, share, etc. As another example, if the incoming message is a newsfeed item that includes one or more photos, each photo may be displayed such that each photo covers substantially the entire display area as the photos are received, and the user may navigate through the photos by performing a pre-determined touch gesture, such as for example, swiping between the photos. In particular embodiments, the social-action notifications of area 50A may be updated based at least in part on interactions with the social-networking system, as illustrated in FIG. 2A. As illustrated in the example of FIG. 2B, social-action notifications associated with the newsfeed or ticker may be added in real-time to area 50B as content on the social-networking system is being generated or uploaded to the social-networking system by users with a relationship to the user of mobile computing device 10 based at least in part on social-graph information, as illustrated in the example of FIG. 2B. As another example, the newsfeed or ticker associated with the user may be updated in real-time on the social-networking system in response to interaction with the social-networking system through social-networking interactive elements 52. Although this disclosure describes particular interactions with particular content objects displayed on the socialized dash, this disclosure contemplates any suitable interactions with any suitable content objects displayed on the socialized dash. Moreover, this disclosure contemplates a socialized dash with an area for displaying any suitable content objects, such as for example, stock price alerts, news notifications, or RSS (really simple syndication) feed.

In particular embodiments, the socialized dash 54 may function as an application launcher, be integrated with, or work in conjunction with an application launcher. In the example of FIG. 2C, the application launcher of socialized dash 54 may include one or more application interactive elements 56, such as for example icons, that each correspond to an application installed on or a function of mobile computing device 10. As an example and not by way of limitation, an application or function of mobile computing device 10 may be executed or "launched" in response to detecting a pre-determined touch gesture, such as for example, tapping an application icon 56 as illustrated in FIG. 2C. In particular embodiments, the application launcher functionality of socialized dash 54 may be accessed by performing a pre-determined touch gesture, such as for example, tension scrolling of the socialized dash 54. As an example and not by way of limitation, tension scrolling is scrolling through the notifications or newsfeed items provided for display in area 50A-B and continuing to scroll past the notifications or newsfeed items, as illustrated in the examples of FIGS. 2A and 2B, respectively. As another example, socialized dash 54 may be "pulled down" (e.g. by tapping and holding the top of socialized dash 54 and pulling it down, thereby revealing application interactive elements 56 underneath socialized dash 54. Furthermore, socialized dash 54 may occupy, such as for example, the bottom 5% of the screen, such that the user may interact with other applications, etc. The user may drag socialized dash back to its original position, thereby covering substantially the entire screen. As described above, socialized dash 54 may function as a lock screen when mobile computing device 10 is in a locked mode. In particular embodiments, mobile computing device 10 may be released from the locked mode in response to performing a pre-determined touch input, such as for example tension scrolling, detected by the touch sensor of mobile device 10. In particular embodiments, releasing mobile computing device 10 from the locked mode may allow interactions with mobile computing device 10. As an example and not by way of limitation, releasing mobile computing device 10 from the locked mode may access the launcher functionality of socialized dash 54, as illustrated in FIG. 2C. In particular embodiments, if mobile computing device 10 is secured with a personal identification number (PIN) lock, mobile computing device 10 may transition from the socialized dash 54 to a PIN screen for the user to provide the PIN to release mobile computing device 10 from the locked mode.

Figure 3:
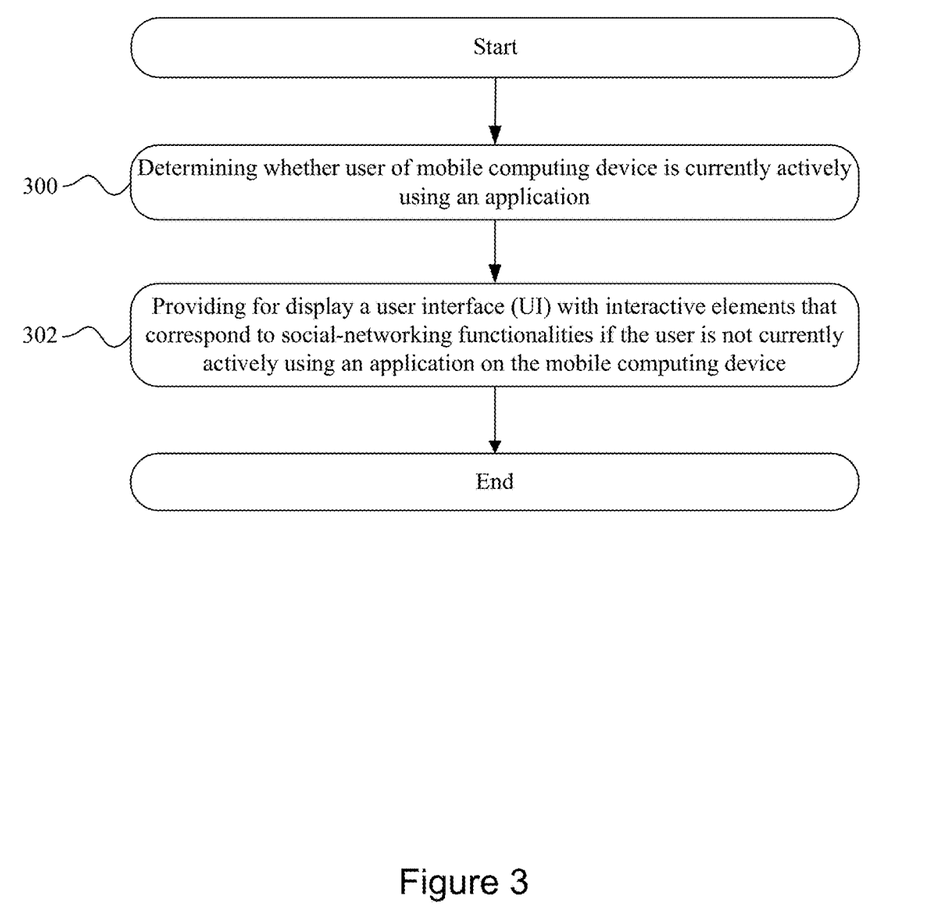
FIG. 3 illustrates an example method for interacting with a social-networking system through a socialized dash.

FIG. 3 illustrates an example method for interacting with a social-networking system through a socialized dash. The method may start at step 300, where a mobile computing device determines whether a user of the mobile computing device is currently actively using an application on the mobile computing device. In particular embodiments, active use of an application includes the user interacting with an application being executed in the foreground and the application processing input from the user in contrast to an application that is executed in the background. At step 302, the mobile computing device automatically and without user input provides for display to the user on the mobile computing device a user interface (UI) comprising a plurality of interactive elements, if the user is not currently actively using an application on the mobile computing device, at which point the method may end. In particular embodiments, each of the interactive elements correspond to one of a plurality of social-networking functionalities provided at least in part by a social-networking system remote from the mobile computing device. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
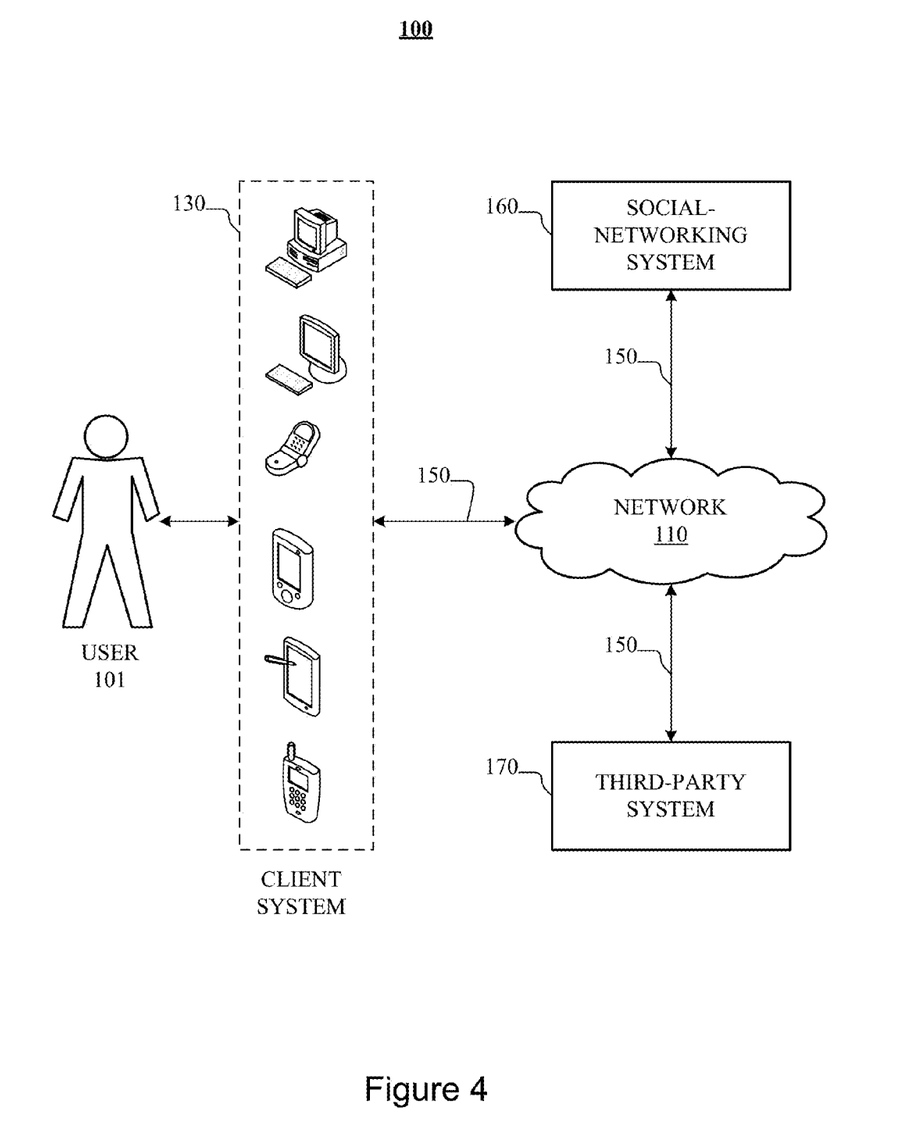
FIG. 4 illustrates an example network environment associated with a social-networking system.
Figure 5:
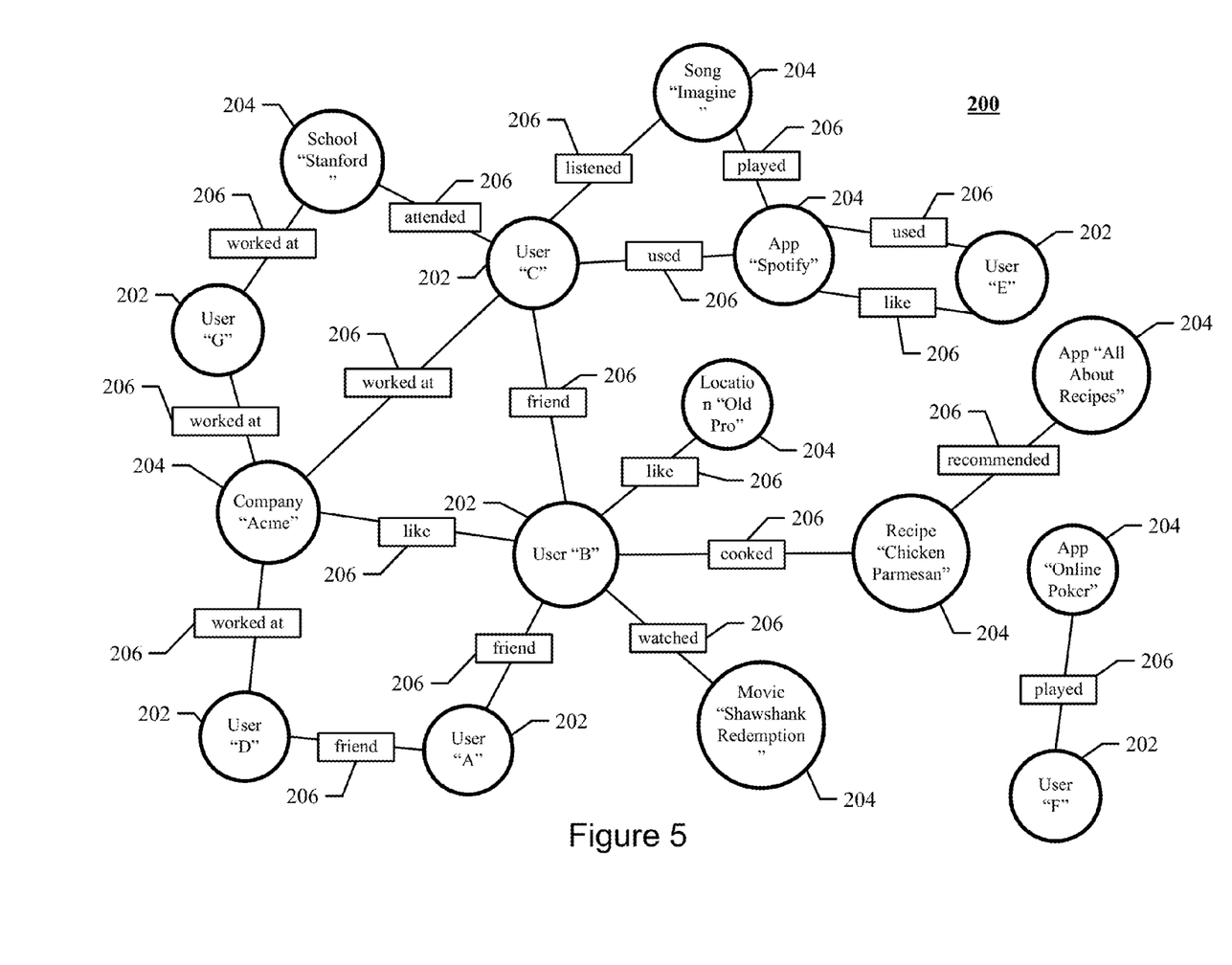
FIG. 5 illustrates an example social graph.

FIG. 4 illustrates an example network environment 100 associated with a social-networking system. Network environment 100 includes a user 101, a client system 130, a social-networking system 160, and a third-party system 170 connected to each other by a network 110. Although FIG. 4 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 5 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. As described above, user 101 may interact with social-networking system 160 through the interactive elements of the socialized dash of client system 130. As an example and not by way of limitation, user 101 may send friend requests to users, responding to friend requests from users, search for users on the social-networking system, or access user profiles of users on social-networking system 160 through the interactive elements of a socialized dash of client system 130. As another example, user 101 may upload a photograph or video, check in at a location, update a status of the user, upload a comment on a post by another user on social-networking system 160, or write a message to or reply to a message from another user on social-networking system 160 through the interactive elements of the socialized dash of client system 130. In particular embodiments, social-networking system 160 may be a network-addressable computing system hosting an online social network. Social-networking system 160 may be accessed by the other components of network environment 100 either directly or via network 110.

Social-networking system 160 may generate, store, receive, and send social-networking data, such as, for example, user-profile data, concept-profile data, social-graph information, or other suitable data related to the online social network. As described above, the socialized dash of client system 130 may be updated based at least in part on interactions with social-networking system 160 through the interactive elements of client system 130. As an example and not by way of limitation, the newsfeed or ticker items from social-networking system 160 may be added to the socialized dash of client system 130 in real-time as content on social-networking system 160 is being generated on or uploaded to social-networking system 160 by users with a relationship to user 101 based at least in part on social-graph information. As another example, the newsfeed or ticker on social-networking system 160 associated with user 101 may be updated in real-time in response to interaction, such as for example, posting a status update or uploading a photo, with social-networking system 160 through the interactive elements of the socialized dash of client system 130.

In particular embodiments, social-networking system 160 may include an authorization server that allows users 101 to opt in or opt out of having their actions logged by social-networking system 160 or shared with other systems (e.g. third-party systems 170), such as, for example, by setting appropriate privacy settings. The authorization server of social-networking system 160 may be used to enforce one or more privacy settings of the users of social-networking system 160. A privacy setting of a user determines how particular information or content objects associated with the user can be shared. In particular embodiments, the determination of the content of the notifications provided by social-networking system 160 for the socialized dash constrained by the privacy settings of the users of social-networking system 160. As an example and not by way of limitation, social-networking system 160 may restrict sending of the content of the notifications for the socialized dash to content set for public sharing, as appropriate.

Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

FIG. 5 illustrates an example social graph. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 5 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. Moreover, the first user may provide this indication through the interactive elements of the socialized dash of the client system of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more data stores 24. In the example of FIG. 5, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "like" icon. As another example, the socialized dash of a client system may include a selectable "check in" icon (such as, for example, a clickable "check in" icon) or a selectable "like" icon. Similarly, after a user clicks these icons, social-networking system 160 may create a "like" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 5) between user nodes 202 corresponding to the user and concept nodes 204 corresponding to the song and application to indicate that the user listened to the song and used the application. Moreover, social-networking system 160 may create a "played" edge 206 (as illustrated in FIG. 5) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 5 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 6:
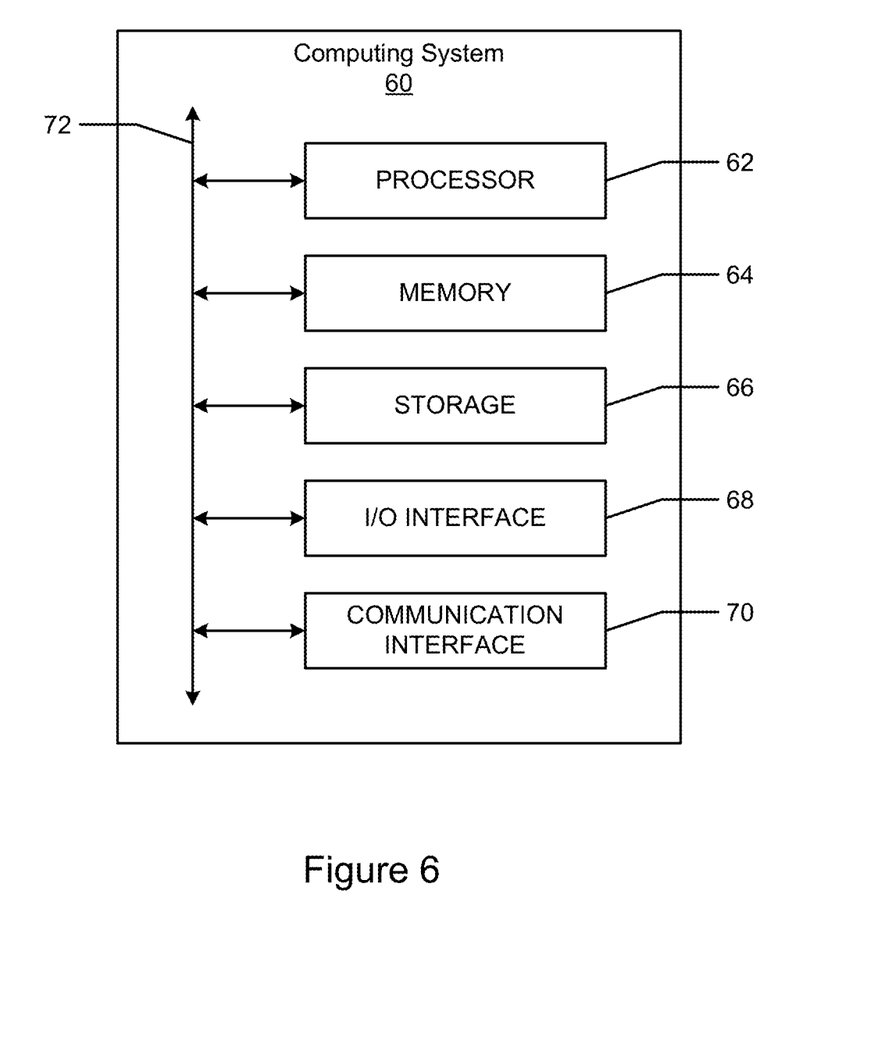
FIG. 6 illustrates an example computing system.

FIG. 6 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a mobile computing device, determining that there is no interaction between a user of the mobile computing device and one or more applications being executed in the foreground on the mobile computing device;
by the mobile computing device, automatically and without user input providing for display to the user on the mobile computing device, a user interface (UI) comprising a plurality of notifications and a plurality of social-networking interactive elements each corresponding to one or more social-networking functions provided by a social-networking system, wherein the determining that there is no interaction between the user and the one or more applications being executed in the foreground is requisite to the display of the UI, and wherein at least one social-networking interactive element provides functionality for updating a status of the user on the social-networking system, and wherein the user interacts with the social-networking system directly from the user interface through the plurality of social-networking interactive elements without launching, on the mobile computing device, an application associated with the social-networking system, and wherein the UI comprises 1) the plurality of notifications, 2) the plurality of social-networking interactive elements, and 3) a background image of the UI is set to a profile picture of the user of the mobile computing device, the profile picture being associated with a social-network identification (ID) associated with the user on the social-networking system;
by the mobile computing device, receiving a user interaction with the social-networking interactive element that provides functionality for updating a status of the user on the social-networking system, wherein the user interaction corresponds to a status update;
by the mobile computing device, sending information associated with the user interaction to the social-networking system; and
by the mobile computing device, updating one or more of the notifications in the UI in real-time in response to the user interaction with the social-networking system directly from the UI through the social-networking interactive element.

2. The method of claim 1, wherein the plurality of social-networking interactive elements comprises:
a first social-networking interactive element corresponding to a friend feature of the social-networking system;
a second social-networking interactive element corresponding to a message feature of the social-networking system;
a third social-networking interactive element corresponding to a social-action-notification feature of the social-networking system; or
a fourth social-networking interactive element for posting to the social-networking system.

3. The method of claim 2, wherein the friend feature comprises:
social-networking functionality for sending friend requests to users of the social-networking system;
social-networking functionality for responding to friend requests from users of the social-networking system;
social-networking functionality for searching for users on the social-networking system; and
social-networking functionality for accessing user profiles of users on the social-networking system.

4. The method of claim 2, wherein posting to the social-networking system comprises:
uploading a photograph or video;
checking in at a location;
updating a status of the user; or
uploading a comment on a post by another user on the social-networking system.

5. The method of claim 1, wherein the UI further comprises an area for displaying one or more of incoming messages, social-activity notifications, or content objects from the one or more applications installed on the mobile computing device.

6. The method of claim 1, wherein the notifications comprise notifications of actions by other users on the social-networking system that relate to the user.

7. The method claim 1, wherein the UI further comprises an area for displaying a newsfeed or ticker provided at least in part by the social-networking system.

8. The method of claim 1, wherein:
the social-networking system comprises a graph comprising a plurality of nodes and edges connecting the nodes, at least one node in the graph corresponding to the user.

9. The method of claim 1, further comprising, by the mobile computing device, providing at least a portion of the UI for display on the mobile computing device when the mobile computing device is in a locked state.

10. The method of claim 1, wherein the UI operates at least in part as a launcher.

11. The method of claim 1, wherein the plurality of notifications and the plurality of social-networking interactive elements are overlaid on top of the background image of the UI.

12. One or more computer-readable non-transitory storage media embodying software configured when executed to:
determine that there is no interaction between a user of the mobile computing device and one or more applications being executed in the foreground on the mobile computing device;
automatically and without user input provide for display to the user on the mobile computing device, a user interface (UI) comprising a plurality of notifications and a plurality of social-networking interactive elements each corresponding to one or more social-networking functions provided by a social-networking system, wherein the determining that there is no interaction between the user and the one or more applications being executed in the foreground is requisite to the display of the UI, and wherein at least one social-networking interactive element provides functionality for updating a status of the user on the social-networking system, and wherein the user interacts with the social-networking system directly from the user interface through the plurality of social-networking interactive elements without launching, on the mobile computing device, an application associated with the social-networking system, and wherein the UI comprises 1) the plurality of notifications, 2) the plurality of social-networking interactive elements, and 3) a background image of the UI is set to a profile picture of the user of the mobile computing device, the profile picture being associated with a social-network identification (ID) associated with the user on the social-networking system;

receive a user interaction with the social-networking interactive element that provides functionality for updating a status of the user on the social-networking system, wherein the user interaction corresponds to a status update;

send information associated with the user interaction to the social-networking system; and update one or more of the notifications in the UI in real-time in response to the user interaction with the social-networking system directly from the UI through the social-networking interactive element.

13. The media of claim 12, wherein the plurality of social-networking interactive elements comprises:

a first social-networking interactive element corresponding to a friend feature of the social-networking system;

a second social-networking interactive element corresponding to a message feature of the social-networking system;

a third social-networking interactive element corresponding to a social-action-notification feature of the social-networking system; or a fourth social-networking interactive element for posting to the social-networking system.

14. The media of claim 13, wherein the friend feature comprises:

social-networking functionality for sending friend requests to users of the social-networking system;

social-networking functionality for responding to friend requests from users of the social-networking system;

social-networking functionality for searching for users on the social-networking system; and social-networking functionality for accessing user profiles of users on the social-networking system.

15. The media of claim 13, wherein the software is further configured to:

upload a photograph or video;

check in at a location;

update a status of the user; or upload a comment on a post by another user on the social-networking system.

16. The media of claim 12, wherein the UI further comprises an area for displaying one or more of incoming messages, social-activity notifications, or content objects from the one or more applications installed on the mobile computing device.

17. The media of claim 12, wherein the notifications comprise notifications of actions by other users on the social-networking system that relate to the user.

18. The media of claim 12, wherein the UI further comprises an area for displaying a newsfeed or ticker provided at least in part by the social-networking system.

19. The media of claim 12, wherein the software is further configured to provide at least a portion of the UI for display on the mobile computing device when the mobile computing device is in a locked state.

20. The media of claim 12, wherein the UI operates at least in part as a launcher.

21. A device comprising:

a processor; and one or more computer-readable non-transitory storage media coupled to the processor and embodying software that:

determine that there is no interaction between a user of the mobile computing device and one or more applications being executed in the foreground on the mobile computing device;

automatically and without user input provide for display to the user on the mobile computing device, a user interface (UI) comprising a plurality of notifications and a plurality of social-networking interactive elements each corresponding to one or more social-networking functions provided by a social-networking system, wherein the determining that there is no interaction between the user and the one or more applications being executed in the foreground is requisite to the display of the UI, and wherein at least one social-networking interactive element provides functionality for updating a status of the user on the social-networking system, and wherein the user interacts with the social-networking system directly from the user interface through the plurality of social-networking interactive elements without launching, on the mobile computing device, an application associated with the social-networking system, and wherein the UI comprises 1) the plurality of notifications, 2) the plurality of social-networking interactive elements, and 3) a background image of the UI is set to a profile picture of the user of the mobile computing device, the profile picture being associated with a social-network identification (ID) associated with the user on the social-networking system;

receive a user interaction with the social-networking interactive element that provides functionality for updating a status of the user on the social-networking system, wherein the user interaction corresponds to a status update;

send information associated with the user interaction to the social-networking system; and update one or more of the notifications in the UI in real-time in response to the user interaction with the social-networking system directly from the UI through the social-networking interactive element.

* * * * *